(12) United States Patent
Levine et al.

(10) Patent No.: US 11,001,045 B2
(45) Date of Patent: *May 11, 2021

(54) ANTI-COUNTERFEITING MEASURES FOR THREE DIMENSIONAL OBJECTS

(71) Applicant: Xerox Corporation, Norwalk, CT (US)

(72) Inventors: Jonathan D. Levine, Rochester, NY (US); Donald M. Pangrazio, III, Leroy, NY (US); David R. Vandervort, Walworth, NY (US); Reiner Eschbach, Webster, NY (US); Jason C. Tsongas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/281,453

(22) Filed: Feb. 21, 2019

(65) Prior Publication Data

US 2019/0184644 A1 Jun. 20, 2019

Related U.S. Application Data

(63) Continuation of application No. 14/617,364, filed on Feb. 9, 2015, now Pat. No. 10,239,264.

(51) Int. Cl.
*B33Y 10/00* (2015.01)
*B33Y 30/00* (2015.01)
*B33Y 99/00* (2015.01)

(52) U.S. Cl.
CPC .............. *B33Y 10/00* (2014.12); *B33Y 30/00* (2014.12); *B33Y 99/00* (2014.12)

(58) Field of Classification Search
CPC .......... B33Y 10/00; B33Y 30/00; B33Y 99/00
See application file for complete search history.

(56) References Cited

U.S. PATENT DOCUMENTS

| 6,363,606 | B1 * | 4/2002 | Johnson, Jr. ............ B29C 41/20 29/854 |
|---|---|---|---|
| 10,239,264 | B2 * | 3/2019 | Levine ................... B33Y 99/00 |
| 2014/0277664 | A1 | 9/2014 | Stump |
| 2015/0242737 | A1 | 8/2015 | Glazberg et al. |
| 2015/0244897 | A1 | 8/2015 | Chapman et al. |

(Continued)

FOREIGN PATENT DOCUMENTS

CN 103366210 A 10/2013

*Primary Examiner* — Joseph S Del Sole
*Assistant Examiner* — Yung-Sheng M Tsui
(74) *Attorney, Agent, or Firm* — Fox Rothschild LLP

(57) ABSTRACT

A method and system of producing a three-dimensional object with an anti-counterfeiting measure uses a processor to access a data file including a plurality of parameters for producing a three-dimensional object, wherein the parameters comprise a plurality of structural parameters. The processor may also cause a three dimensional printing device to form the three dimensional object that exhibits the structural parameters by identifying a build material, identifying at least one anti-counterfeiting measure that when included in the 3D object will prevent creation of a digital model of the three-dimensional object by causing the 3D object to obstruct a possible 3D scanning method, and causing the three dimensional printing device to form the three-dimensional object with the anti-counterfeiting measure using the build material.

11 Claims, 5 Drawing Sheets

(56) References Cited

U.S. PATENT DOCUMENTS

2016/0221114 A1    8/2016  Dietrich
2016/0259306 A1*   9/2016  Pangrazio, III ....... H04L 9/3247
2016/0332477 A1*  11/2016  Kuczynski ............ B29C 70/745
2016/0375676 A1*  12/2016  Ritchie .................. B22F 10/00
                                                          428/29

* cited by examiner

ANTI-COUNTERFEITING MEASURES FOR THREE DIMENSIONAL OBJECTS

CROSS REFERENCE TO RELATED APPLICATIONS

This application claims priority to, and is a continuation of U.S. patent application Ser. No. 14/617,364, filed Feb. 9, 2015, the disclosure of which is incorporated herein by reference in its entirety.

BACKGROUND

Additive Layer Manufacturing (ALM), also commonly referred to as 3D printing, is a process of making three-dimensional (3D) objects from a digital file such as Computer-Aided Design (CAD) data. Combining 3D printing with 3D scanning also makes possible 3D copying, i.e., a process where first a 3D digital model of an object is made by 3D scanning of the object and then a 3D copy of the 3D object is made by 3D printing a copy of the digital model. While this technology can bring many benefits, the advent of low-cost 3D print manufacturing also may increase the potential for counterfeiting. 3D printing and 3D scanning technologies can make it easier for one person to reproduce an object that is of another person's design.

Various methods are used today to prevent counterfeiting and provide authentication. Seals, watermarks and holograms are designed to provide reasonable protection against counterfeiters. Bar codes, QR codes and RFID chips are used to identify and authenticate objects. And transparent objects, such as glass bottles, may have 3D symbols engraved on their surface and even embedded in them. The problem with most of these methods is that they are visible and therefore can be copied by many 3D printing systems. Thus, so can the objects they intend to protect.

Prior art methods also try to solve this problem by aiding in the enforcement of intellectual property rights. However, current intellectual property laws and protection mechanisms are only effective in enforcing and/or preventing individual sources of intellectual property theft. Such laws and protection mechanisms, however, may be less effective in enforcing and/or preventing distributed or multiple sources of intellectual property theft, as may be the case with individuals utilizing 3D printing technology to produce items that infringe protected or proprietary designs.

Finally, there exist no methods to prevent the scanning of a 3D object to develop a digital model of the 3D object.

This document describes methods and systems that are directed to at least some of the problems described above.

SUMMARY

In an embodiment, a processing device implements a method of producing a three-dimensional object with an anti-counterfeiting measure by accessing a data file comprising a plurality of parameters for producing a three-dimensional object, wherein the parameters comprise a plurality of structural parameters. The processing device further causes a three dimensional printing device to form the three dimensional object that exhibits the structural parameters. The processor will do this by identifying a identifying a build material, identifying at least one anti-counterfeiting measure that when included in the 3D object will prevent creation of a digital model of the three-dimensional object by causing the 3D object to obstruct a possible 3D scanning method, and causing the three dimensional printing device to form the three-dimensional object with the anti-counterfeiting measure using the build material.

In some embodiments, the processing device may also identify one or more concealment parameters that cause the 3D object to exhibit the at least one anti-counterfeiting measure.

In certain embodiments, identifying the at least one anti-counterfeiting measure may include identifying the possible 3D scanning method based on at least one of the following: the structural parameters, the build material, a complexity value of the three-dimensional object, or a monetary value of the three-dimensional object. In other embodiments, or in addition, the possible 3D scanning method is selected from at least of the following: x-ray 3D scanning, laser 3D scanning, ultrasound 3D scanning, magnetic resonance imaging 3D scanning, and contact 3D scanning.

In some embodiments, identifying the possible 3D scanning method based on the build material includes identifying a density value of the build material, comparing the density value with a threshold value, and identifying a deep penetrating scanning method as the possible 3D scanning method if the density value is greater than the threshold value, else identifying a surface scanning method as the possible 3D scanning method.

In certain other embodiments, identifying the possible 3D scanning method based on the complexity value includes retrieving a complexity value of the three-dimensional object from a database, comparing the complexity value with a threshold value, and identifying a deep penetrating scanning method as the possible 3D scanning method if the complexity value is greater than the threshold value, else identifying a surface scanning method as the possible 3D scanning method.

In some other embodiments, identifying the possible 3D scanning method based on the complexity value includes retrieving a monetary value of the three-dimensional object from a database, comparing the monetary value with a threshold value, and identifying an expensive scanning method as the possible 3D scanning method if the monetary value is greater than the threshold value, else identifying a non-expensive scanning method as the possible 3D scanning method.

In certain embodiments, the at least one anti-counterfeiting measure may include including a concealment material within the 3D object and/or imparting a concealment pattern on one or more surfaces of the 3D object Optionally, the concealment material includes an ultrasound-shielding or ultrasound-absorbing material. Optionally, and or additionally, the concealment material includes a laser-shielding or laser-absorbing material. Optionally, and or additionally, the concealment material includes an x-ray shielding or x-ray absorbing material. Optionally, and or additionally, the concealment material includes gamma-ray shielding or gamma-ray absorbing material. Optionally, and or additionally, the concealment material includes a ferromagnetic material that, when exposed to a magnetic field from a magnetic resonance imaging system, will cause the object to alter its shape. Optionally, and or additionally, the concealment material includes a cantilevered mirror.

Optionally, the concealment pattern includes a plurality of hooks arranged and positioned to prevent creation of an accurate copy of the 3D object by a contact scanner. Optionally, the concealment pattern includes a pattern that is not visible on the three-dimensional object, and the concealment pattern is included in a copy of the 3D object such that it indicates to a user that the copy of the 3D object is a counterfeit.

In another embodiment, a system for producing a three-dimensional object with an anti-counterfeiting measure includes a processing device and a computer-readable memory containing programming instructions that, when executed by the processing device, cause the processing device to access a data file comprising a plurality of parameters for producing a three-dimensional object, wherein the parameters comprise a plurality of structural parameters. The programming instructions also include instructions that cause a three dimensional printing device to form the three dimensional object that exhibits the structural parameters. The processing device will do this by identifying a build material, identifying at least one anti-counterfeiting measure that when included in the 3D object will prevent creation of a digital model of the three-dimensional object by causing the 3D object to obstruct a possible 3D scanning method, and causing the three dimensional printing device to form the three-dimensional object with the anti-counterfeiting measure using the build material.

DETAILED DESCRIPTION

Figure 1:
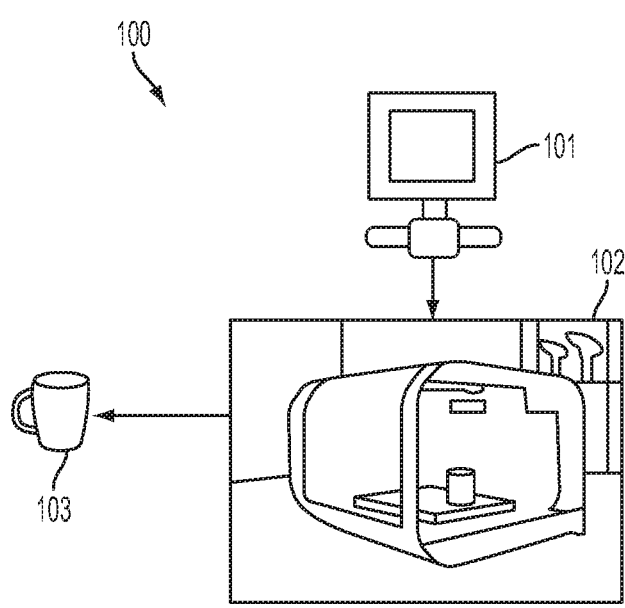
FIG. 1 illustrates a schematic representation of a system for producing a three dimensional object, according to an embodiment.

For purposes of this document, the following terms shall have the following meanings:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" refers to a device that includes a processor and non-transitory, computer-readable memory. The memory may contain programming instructions that, when executed by the processor, cause the computing device or electronic device to perform one or more operations according to the programming instructions. As used in this description, a "computing device" or an "electronic device" may be a single device, or any number of devices having one or more processors that communicate with each other and share data and/or instructions. Unless the context specifically dictates otherwise, the term "processor" will include embodiments having a single processor, as well as embodiments in which multiple processors collectively perform various steps of a process. Examples of computing devices and/or electronic devices include personal computers, servers, mainframes, gaming systems, televisions, and portable electronic devices such as smartphones, personal digital assistants, cameras, tablet computers, laptop computers, media players and the like.

The terms "three dimensional printing" and "3D printing" refer to one of various processes of forming a three-dimensional object from a model or other electronic data source through a process by which multiple layers of a build material are formed and cured, typically under control of a computing device. Examples of 3D printing processes include, without limitation, stereolithography, selective laser sintering, fused deposition modeling and laminated object manufacturing.

The terms "three dimensional printing device" and "3D print device" refer to a device or system that is capable of performing a 3D printing process. A 3D print device will include a processor. The processor will implement programming instructions, typically using parameters from a data file, that cause an applicator of the device to selectively deposit layers of a build material (such as a photopolymer or powder), and that cause a radiation generating device (such as a laser or heat source) to selectively apply energy to help cure the deposited layers of build material. As used throughout this disclosure, the terms "three-dimensional printing system," "three-dimensional printer," "3D print device," "3D printing system," and "3D printer" refer to any now or hereafter known 3D printing system or printer.

The terms "three dimensional scanning device" and "3D scanner" refer to a device or system that is capable of scanning a three-dimensional physical object and generate a digital model of the physical object. A 3D scanning device will include a processor and one or more sensors that can sense physical attributes of the objects. The sensors may include, for example, an image sensor (camera), sonic sensor (e.g., sonar), materials or chemical properties sensor, a magnetic sensor, an x-ray device, a combination of an infrared camera with an infrared light source, or other sensors. The processor will implement programming instructions, typically using parameters from a data file, that cause the sensor to collect data that is used to generate a digital model of a 3D object. As used throughout this disclosure, the terms "three-dimensional scanning system," "three-dimensional scanner," "3D scanning device," "3D scanning system," and "3D scanner" refer to any now or hereafter known 3D printing system or printer.

"Designing" an object means performing any action or combination of actions which modifies or creates a file comprising data that models or is used to build an object. Designing may be performed on an object which has been previously created as well as for creating a new object from scratch.

"Structural parameters" are data points or rules of design that define the structure of a 3D object. The structural parameters for a 3D object may be included in a data file that a 3D print device may access to construct the 3D object. Examples may include the shape, size, color, surface geometry, interior geometry, build material and other such information.

"Anti-counterfeiting measures" or "Countermeasures" are attributes that when included in a 3D object alter the electromagnetic, acoustic or other signature(s) of the 3D object such that the 3D object itself obstructs the 3D scanning of the object, using one or more scanning technologies, and prevent the generation of a digital model of the 3D object.

"Concealment parameters" are a set of structural parameters that cause a 3D object to exhibit at least one anti-counterfeiting measure. Examples may include concealment material, concealment design, concealment pattern, background alteration, location, amount, and other such signature altering parameters.

It should be appreciated that a 3D object (manufactured using a 3D printer) may be any type of object imaginable, and that the embodiments disclosed herein should not be understood to apply to only certain types or classes of 3D objects.

FIG. 1 shows a schematic representation of a system embodiment for manufacturing a desired 3D object(s) 103 using a 3D print device 102. The 3D print device 102 may be in communication with a computing device 101 having a memory device for storing computer-aided design (hereinafter "CAD") software capable of designing and creating objects for 3D printing. In some embodiments, the computing device 101 may be integral with the 3D print device 103. Alternatively, the computing device 101 and 3D print device 101 may be separate devices that share data files by one or more communication networks, or by a physical or manual file transfer process. Typically, CAD files contain specifications, from which geometry of an object is generated, which in turn allow for a representation of the object to be generated. Geometry and representation may be stored in a single CAD file or multiple ones. The CAD software module includes graphic tools for representing the modeled objects to the designers. These tools are dedicated to the display of complex objects. A CAD system manages models of objects, which are stored in electronic files. The methods disclosed herein can also be implemented as stand-alone software not dependent on pre-existing CAD software or CAD framework. Such a program may implement its own GUI, and may use standard 3D software libraries for 3D model generation. Alternatively, such a program may implement its own libraries for generating 3D models. The use of CAD software in this disclosure is by way of example, and a person skilled in the art will understand that other software and/or design tools may be used without diverting from the principles of the disclosure.

The computing device may also include one or more systems for enhancing the functionalities of the original CAD software such that it may allow a user to include one or more concealment parameters in a 3D object in accordance with the principles disclosed here. The add-on enhancement module(s) may be a software application including functionality to allow a user to identify and/or define one or more anti-counterfeiting measures, and include the related concealment parameters in the object 103. In some embodiments, the add-on enhancement module may be stored in a memory device of the computing device 101. Alternatively, the add-on enhancement module may be provided on a separate device (such as a memory stick) or as a cloud-based software application that may share data files with the CAD software by one or more communication networks, or by a physical or manual file transfer process.

Figure 2:
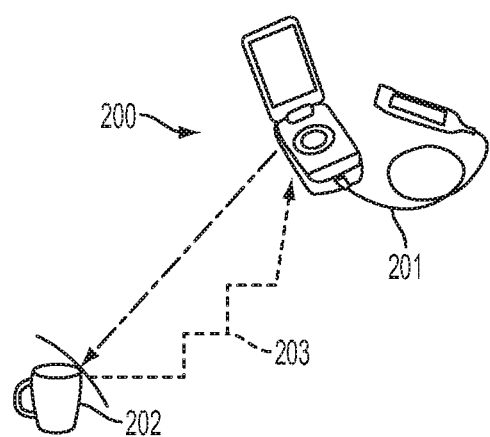
FIG. 2 illustrates a schematic representation of a system for scanning a three dimensional object, according to an embodiment.

FIG. 2 shows a schematic representation of a prior art system 200 including a 3D scanner 201 for scanning a 3D modeled object(s) 202 (as discussed below). The scanner may be a hardware equipment and/or a software application in communication with a computing device. As shown in FIG. 2 the countermeasure(s) included in the rendered 3D object prevent and/or disrupt the return signal 203. The 3D scanner may be any known 3D scanner used to model the shape and structure of an object (i.e., identify structural parameters) based on the return signal to create a digital model. Therefore, disruption and/or prevention of the return signal may prevent the scanner from accurately identifying the structural parameters of the 3D object.

The 3D scanner may analyze a real-world object or environment to collect data on its shape and possibly its appearance (i.e. color). The collected data can then be used to construct digital, three dimensional models. The 3D scanner may create a point cloud of geometric samples on the surface of the subject. These points can then be used to extrapolate the shape of the subject (a process called reconstruction). If color information is collected at each point, then the colors on the surface of the subject can also be determined.

The point clouds produced by 3D scanners can be used directly for measurement and visualization in the architecture and construction world. Most applications, however, use instead polygonal 3D models, NURBS surface models, or editable feature-based CAD models (aka Solid models).

For most situations, a single scan will not produce a complete model of the subject. Multiple scans, even hundreds, from many different directions are usually required to obtain information about all sides of the subject. These scans have to be brought into a common reference system, a process that is usually called alignment or registration, and then merged to create a complete model. This whole process, going from the single range map to the whole model, is usually known as the 3D scanning pipeline.

Examples of 3D scanning may include:

(a) Contact scanning where the scanner touches the surface of an object to determine its shape; this is the slowest method but normally the most accurate. However, these methods require contact with the object being scanned and thus the act of scanning the object may modify or damage it. This fact is very significant when scanning delicate or valuable objects such as historical artifacts.

(b) Non-contact active scanning where the scanner emits some kind of radiation or signal to either detect is reflection, or to detect the radiation passing through the object. Examples may include laser scanners, ultrasound scanners, X-ray scanners, and nuclear imaging scanners (discussed below). Laser scanners use either time-of-flight methods or triangulation methods to create cloud points for an object.

Non-contact passive scanning where the scanners do not emit any kind of radiation themselves, but instead rely on detecting reflected ambient radiation. Most scanners of this type detect visible light because it is a readily available ambient radiation. Examples may include photographic scanners. Other types of radiation, such as infrared may also be used.

Figure 3:
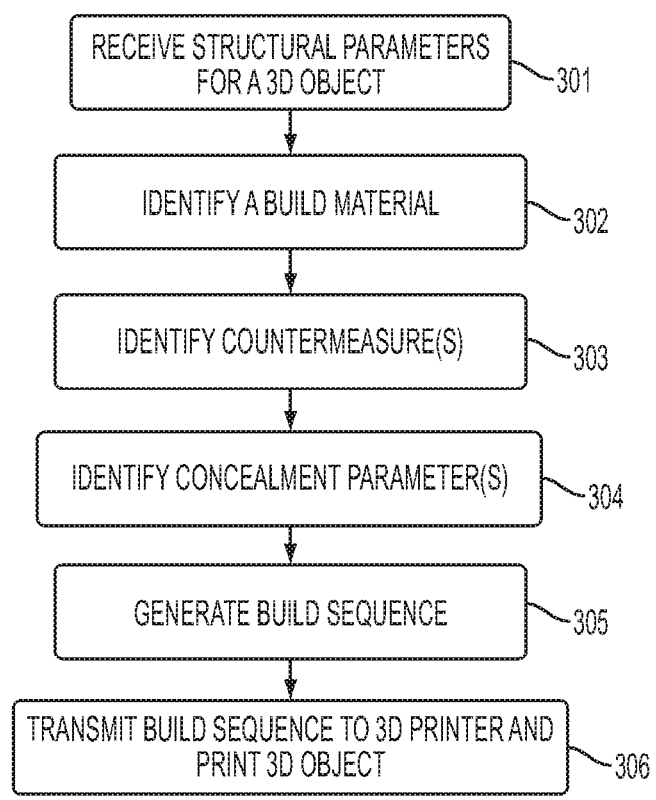
FIG. 3 depicts a flow chart example of a process for producing a three dimensional object including anti-counterfeiting measures, according to an embodiment.

With reference to the flowchart of FIG. 3, a method for designing and/or building a 3D object which may include anti-counterfeiting measure(s), is disclosed. In an embodiment, an add-on enhancement for a known CAD software module may provide instructions to a processor of the computing device to perform the method as described in FIG. 2. Alternatively, the add-on enhancement module may perform at least part of the method as described in FIG. 2.

In step 301, the system may receive structural parameters for a desired 3D object. Examples of structural parameters may include, without limitation, dimensions, shape, geometry, and build material. In an embodiment, the system may receive the structural parameters for a 3D object that is to be printed from a 3D print device. The 3D print device may do this by retrieving a design file from a database by querying a database for existing design files. Alternatively, the 3D print device may receive structural parameters from a user, via a user interface, and use the parameters to create the design file.

In another embodiment, the system may receive the design files via a scanner (described above) by scanning a reference 3D object to create one or more visualization files, including structural parameters, representing a model of the reference 3D object. Such visualization files may provide data for rendering a two-dimensional ("2D") and/or 3D visualizations of the reference 3D object on a display device communicatively coupled to, or integrated in, the computing device. Visualization file types may include, by way of example, .asm, STL, IGES, STEP, Catia, SolidWorks, ProE, 3D Studio, and/or Rhino files. In some embodiments, the visualization files may include 2D ("flat") digital images, such as a JPEG, GIF, TIFF, BMP, and/or PDF files. The system may transmit the visualization files to the CAD software for modifying and/or generating 3D CAD files representing the reference 3D object. A 3D print device may then use the file(s) to print any number of replicas of the reference object, as described below. Specifically, CAD files contain specifications, from which geometry is generated, which in turn allow for a representation to be generated. Geometry and representation may be stored in a single CAD file or multiple ones. In certain embodiments, the CAD file(s) for creating the 3D object may be directly rendered using CAD software and based on any suitable tangible or imaginary object. In certain other embodiments, the system may retrieve the CAD file directly from a stored database of CAD files for objects.

In step 302, the system may identify a build material(s). In certain embodiments, information regarding the build material(s) may be included in the structural parameters. In certain other embodiments, the build material(s) may be specified by the user. Alternatively, the system may identify the build material(s) based on the structural parameters. For example, the system may identify a build material(s) based on the shape and geometry of the 3D object such that the build material(s) may exhibit the required strength, rigidity, weight, folding characteristics, and other properties calculated based on the specified geometrical and/or shape constraints.

In step 303, the system may identify a countermeasure(s) that when included in the 3D object may obstruct the scanning of the rendered 3D object. In certain embodiments, the user may define the countermeasure(s) to be included in the 3D rendered object, via a user interface.

In certain other embodiments, the system may identify the countermeasure(s) by first identifying the type of 3D scanner that may be used to scan the object, and then identifying at least one countermeasure, which when included in the 3D object, may prevent the identified 3D scanner from modelling the 3D object. In an embodiment, the system may access a database(s) of rules and/or information about various scanners that may help the system link a type of 3D scanner with at least one countermeasure. For example, each scanning technology may be linked to at least one countermeasure that may obstruct the 3D scanning, and the related concealment parameters (discussed below). The type of 3D scanner may be identified based on, without limitation, the structural parameters, build material, type of the object, and/or potential use of the object possible scanner.

The system may identify the type of 3D scanner that may be used to scan the object based on logic that is pre-programmed into the system, or logic that it may receive from a data file. Examples of such logic may include:

i. A rule set requiring identifying a 3D object and accessing a complexity database and/or other information source(s) to retrieve an approximate complexity value of the identified object. If the object is not found in the database, the system may generate a complexity value by comparing the object to similar objects in the database. In certain embodiments, a user may be allowed to specify the complexity level of the 3D object. In an embodiment, the complexity database may be developed by receiving user input regarding a variety of 3D objects, and updating the database when a new 3D object is identified. The system may then compare the complexity value with a threshold value. If the complexity value is found to be below the threshold value than the system may infer that an adequate point can be obtained by surface 3D scanning technologies such as laser scanning and photography. Examples of simple objects with a complexity value below a threshold level may include, without limitation, a coffee mug, dental implants, and photo frames.

On the other hand, if the complexity value is found to be above the threshold value then the system may infer that a deep scanning technology such as X-ray scanning, ultrasound scanning, and/or nuclear imaging techniques will yield a complete point cloud. A surface scan may not give sufficient information to construct the finished product. Examples of complex objects may include objects with an interior structure, such as an artificial limb, a machine part such as a turbine, etc. and may require deep penetration scanning techniques to get adequate information for generating the complete point cloud.

ii. A rule set requiring identifying a 3D object and accessing an information source to retrieve an approximate monetary value of the identified object. In some embodiments, the monetary value may be based on the intended use of the object. The system may then compare the monetary value with a threshold value. The system may then infer that more expensive and/or time consuming scanning methods (such as nuclear imaging) may be employed to create digital models and render copies of 3D objects whose monetary value is found to be above a threshold value, and cheaper scanning methods (such as contact scanning and/or laser scanning) may be employed for 3D objects whose monetary value is found to be below the threshold value. Examples of 3D objects whose monetary value may be above the threshold value may include video game accessories, camera lens, and working guns. On the other hand, examples of 3D objects whose monetary value may be below the threshold value may include a coffee mug, a pen, etc.

iii. A rule set requiring identifying at least one possible scanning method based on the build material of the 3D object. The system may identify a build material of the 3D object and access an information source to retrieve an approximate density value of the build material. The system may then compare the density value with a threshold value, and identify deep penetrating scanning methods such as ultrasound as the possible 3D scanning technology, if the density value is found to be above a threshold value. The system may identify surface scanning methods such as laser scanning as the possible 3D scanning technology, if the density value is found to be below a threshold value.

iv. A rule set requiring identifying at least one possible scanning method based on the structural parameters of the 3D object. For example, the system may determine that contact scanning may be the most accurate scanning method for scanning a 3D object with numerous pits on the surface of the object by accessing an information source describing the types of shapes that may be scanned by different types of scanners, and the countermeasure(s) may include including concealment parameters within the 3D object that obstruct contact scanning.

The threshold values in the above examples may be defined by the user. In certain embodiments, the threshold value may be determined by the system based in previous user inputs and/or accessing information sources regarding the properties of different types of scanners.

As discussed above, the system may then identify at least one countermeasure by linking to the identified 3D scanner(s) by accessing a database(s) of rules and/or information source(s) about various scanners, their properties, and/or modes of operation. In an embodiment, the countermeasure(s) may prevent a 3D scanner from building a point cloud with enough points to replicate the scanned object (as shown in FIG. 2) by obstructing (preventing and/or altering) the return scanner signal.

Examples of countermeasure(s) based on the type of 3D scanning method, by obstructing the return scanner signal, may include:

i. Ultrasound scanning: A countermeasure may be a rendered 3D object impregnated with an ultrasound shielding and/or ultrasound absorbing material (concealment material) that may prevent a clear image from forming on an ultrasound detector, thereby preventing the creation of a digital model of the 3D reference object. Ultrasound scanners generate sound (either continuous waves or pulses) in frequencies outside the audible range. The scanner's electronics then detect the return sound signal as it reflects off of the target object, and then analyzes the return signal to form an image. Soft, "lossy" materials may block ultrasound imaging by absorbing the ultrasound waves, thereby preventing or inhibiting reflection. Examples of ultrasound blocking materials may include, without limitation, highly scattering or absorbing materials such as highly loaded silicone rubber materials, composites of (typically shredded) lead loaded silicone rubber and epoxy, possibly glass microspheres in an epoxy matrix, foam, balsa wood, high-density polyethylene (HDPE) (such as that commercially available under the brand TYVEK), expanded polytetrafluoroethylene (ePTFE), and/or ultrasound blockers made from castor oil, silicone oil, soybean oil, or peanut oil.

ii. Laser 3D scanning: A rendered 3D object including countermeasures for changing the angle or path of the laser light, and/or by absorbing the laser light. In an embodiment, the angle or path of the laser light may be changed by including microscopic, cantilevered mirrors onto the object's surface using 3D printing techniques. In certain embodiments, the mirrors may be designed to move to random positions when the object is moved or when air currents pass across the surface of the object such the laser scanner signal encounters a random reflective surface rather than a constant reflective surface, and the scanner's arrangements of the point cloud may be distorted. Alternatively and/or additionally, the surface of the 3D object may be entirely or partly impregnated with laser shielding and/or laser absorbing material (and/or structures) that may prevent a clear image from forming on a laser detector, thereby preventing the creation of a digital model of the 3D reference object. Examples of laser shielding materials may include, without limitation, coherent perfect absorber (CPA) that uses a uses a silicon wafer, a light-absorbing material, which absorbs coherent light and converts it to some form of internal energy such as heat or electrical energy, a lattice of niobiumnitride, plastic dyed with colors that can block specific wavelengths of laser light, and/or graphene.

iii. X-ray 3D scanning: A countermeasure may be a rendered 3D object impregnated with an x-ray shielding and/or x-ray absorbing material (concealment material) that may prevent a clear image from forming on an x-ray detector, thereby preventing the creation of a digital model of the 3D reference object. X-ray 3D scanner utilizes high energy x-rays to create digital images of the inside of 3D objects. The x-rays pass through the object being scanned and are captured by a detector on the other side of the object. If some of the object's contents absorb x-rays, the detector sees different x-ray levels in different locations. The detector, in turn, processes the x-rays it receives and produces an image that distinguishes the object's internal structure. X-ray absorbing material may alter the received x-ray signal. Examples of x-ray absorbing material may include, without limitation, lead monoxide, lead sulfate, and/or barium sulfate.

iv. Nuclear imaging 3D scanning: A countermeasure may be a rendered 3D object impregnated with a gamma ray shielding and/or gamma ray absorbing material (concealment material) that may prevent a clear image from forming on an x-ray detector, thereby preventing the creation of a digital model of the 3D reference object. Examples of gamma ray absorbing material may include, without limitation, lead monoxide, lead sulfate, and/or barium sulfate.

v. Photographic (and/or video) imaging 3D scanning: A countermeasure may be a rendered 3D object impregnated with light absorbing material (concealment material) that may prevent a clear image from forming on an photographic detector, thereby preventing the creation of a digital model of the 3D reference object. Alternatively, at least one periodic pattern including fine circular or wavy designs may be embedded into the 3D object such that, when visible light bounces off the 3D object, a moiré pattern is exhibited, rather than an exact copy of the original. Other methods known in the art to prevent photography are within the scope of this disclosure.

Alternatively and/or additionally, the countermeasure(s) may include embedded materials that cause the rendered 3D object to alter its shape upon detection of 3D scanning signals. In some embodiments, altering the shape may include self-destruction of the 3D object. In an embodiment, the identified countermeasure(s) may be inclusion of a detection system in the rendered 3D object, and/or a shape altering mechanism. The detection system may include, without limitation, any known methods of detecting laser signals, ultrasound signals, x-ray signals, photography signals, and/or contact scanning. Additionally and/or optionally, the countermeasure(s) may enable the 3D object to alter its shape upon scanning. An example may include impregnating a rendered 3D object with ferromagnetic material(s) such that the object is altered and/or destroyed when scanned by magnetic resonance imaging (MRI) technology, thereby preventing the creation of a digital model of the 3D reference object. MRI relies on detecting a radio frequency signal emitted by excited hydrogen atoms. The very high strength of an MRI's magnetic field may cause heat, torque, and missile-effects (where objects are attracted to the center of the magnet, causing them to become projectiles) in ferromagnetic materials causing destruction of the object containing the ferromagnetic material.

Alternatively and/or additionally, the identified countermeasure(s) may be a pattern printed on the digital model (and thus the 3D copy of the object) of the rendered 3D object which may signal to the user that the 3D copy of the object formed from the digital model is a counterfeit. For example, photographic (and/or video) 3D scanning methods may be prevented by including, in the rendered 3D, one or more periodic patterns. The periodic patterns may be included on the surface of the 3D object and/or as an internal structure. For example, a "VOID" and/or a "COUNTERFEIT" pattern may be included in the digital model of the 3D object upon photographic scanning. Alternatively and/or additionally, moiré patterns may be exhibited by including fine circular or wavy designs that are likely to exhibit a moiré pattern as an "alias" when scanned and printed. A moiré is the perception of a distinctly different third pattern which is caused by inexact superimposition of two similar patterns. An alias is a distortion that occurs in an image when a signal reconstructed from samples is different from the image's original continuous signal. It will be understood to those skilled in the art that similar interference patterns may be used to prevent other 3D scanning methods.

Figure 4:
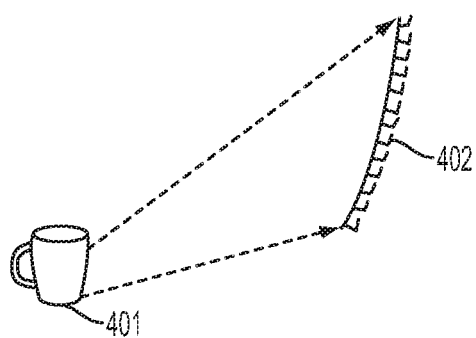
FIG. 4 illustrates a schematic representation of a three dimensional object including structures on the surface that act as anti-counterfeiting measures against contact scanning, according to an embodiment.

In another example, contact 3D scanning may be prevented by rendering a 3D object that may include three-dimensional structures or patterns on the object's surface such that a contact 3D scanner cannot probe underneath these structures. As shown in FIG. 4, the contact scanner, thus, cannot create points under the hooks 402 and therefore cannot create an exact digital model of the object 401. Examples of three-dimensional structures may include structures and/or patterns that may prevent the contact scanner from touching certain areas on the surface of the 3D object, such as small hooks or hidden crevices.

Pursuant to step 304, the add-on module may identify at least one concealment parameter for each of the identified countermeasures to be included in the rendered 3D object. In some embodiments, the user may define at least some or all the concealment parameters. In certain other embodiments, the system (via the add-on module) may identify at least some of the concealment parameters based on, without limitation, the identified anti-counterfeiting measure(s) such that the concealment parameter when included in the rendered 3D object, cause the object to exhibit the anti-counterfeiting measure.

In an embodiment, exhibiting the identified countermeasure(s) based on the type of 3D scanning method, by obstructing the return scanner signal, may include identifying concealment parameters such as identifying the concealment material(s), identifying the location of the concealment material, and/or identifying the amount of the concealment material. Other concealment parameters are within the scope of this disclosure.

For example, the system may determine a surface area and/or a volume of the 3D object and then determine an amount of concealment material that may be sufficient to obstruct the scanning signal using the surface area and/or volume, properties of the concealment material, and the characteristics of the of the 3D scanner. Other information such as geometry and user defined criteria may also be used in the determination of amount and placement of the concealment material. In an embodiment, once the module has determined an amount of the concealment material, it may apply user-defined rules and/or pre-programmed logic to determine the logic information. Examples of such logic may include: (i) a rule set requiring that structural strength of the 3D object always be above a threshold value; (ii) a rule set requiring that certain types of concealment material be embedded inside the 3D object, and certain other types of concealment material be embedded on the surface of the 3D object; (iii) a rule set requiring that the concealment material may not be visible; and (iv) a rule set defining the relationship(s) between a possible type of 3D scanner to be used and the location of the concealment; and a combination thereof. It should be noted, that while the above example discloses identifying an amount of the concealment material based on the type of concealment material, and identifying the placement of the concealment material based on the amount; other orders of identifying the various concealment parameters are within the scope of this disclosure. For example, the concealment material may be selected based on the amount and positions of the concealment material.

In another embodiment, exhibiting the identified countermeasure(s) that may cause the 3D object being scanned to alter its shape, may include identifying concealment parameters such as identifying the concealment material(s), identifying the location of the concealment material, and/or identifying the amount of the concealment material that may be sufficient to cause the alteration of the shape of the 3D object.

In certain other embodiments, exhibiting the identified countermeasure(s) that may cause a concealment pattern to be printed on the digital model and/or the copy of the 3D object, may include identifying concealment parameters such as identifying the concealment pattern(s), placement of the concealment pattern(s), number of the concealment pattern(s), and/or identifying three-dimensional structures for preventing contact 3D scanning.

It should be appreciated that a combination of any number of the countermeasures disclosed above may be used simultaneously to prevent scanning and copying of a 3D object.

After the identification of one or more concealment parameters, the add-on enhancement may generate and save 305 a build sequence for building the 3D object, including the concealment parameters, using a 3D printer, such that the 3D object exhibits the identified countermeasure(s).

In step 306, the add-on enhancement may transmit the build sequence to any known 3D printer to build the 3D object with the concealment parameters included to exhibit the identified countermeasure(s). For example, the 3D printer may deposit a mixture of the build material and the concealment material in a plurality of layers in accordance with the concealment parameters.

Figure 5:
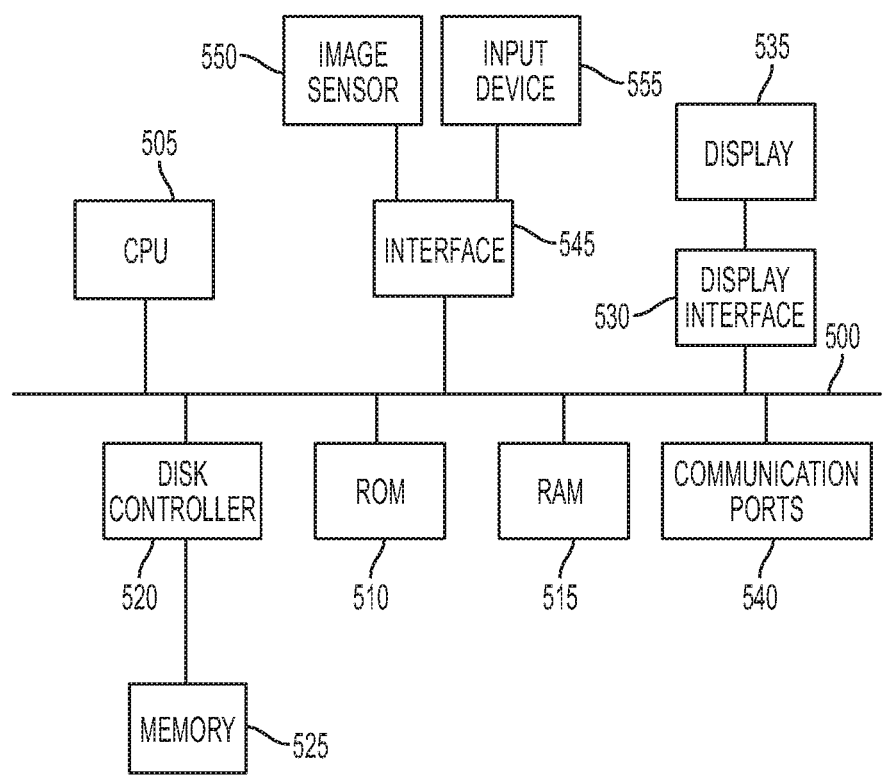
FIG. 5 illustrates a block diagram of example hardware that may be used to contain or implement program instructions according to an embodiment.

FIG. 5 depicts a block diagram of hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 4, is an example of an electronic device, computing device or processor as such terms are used within this disclosure. Read only memory (ROM) 510 and random access memory (RAM) 515 constitute examples of non-transitory computer-readable storage media.

A controller 520 interfaces with one or more optional non-transitory computer-readable storage media 525 to the system bus 500. These storage media 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible, non-transitory computer-readable medium such as a compact disk, a digital disk, flash memory, a memory card, a USB drive, an optical disc storage medium and/or other recording medium.

An optional display interface 530 may permit information from the bus 500 to be displayed on the display 535 in audio, visual, graphic or alphanumeric format. Communication with external devices, such as a printing device, may occur using various communication ports 540. A communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

The invention claimed is:

1. A method of producing a three-dimensional (3D) object with an anti-counterfeiting measure, the method comprising:
   by a processor, accessing a data file comprising a plurality of parameters for producing a 3D object, wherein the parameters comprise a plurality of structural parameters; and
   by the processor, causing a 3D printing device to form the 3D object that exhibits the structural parameters by:
      identifying a build material,
      identifying at least one anti-counterfeiting measure that when included in the 3D object will prevent creation of a digital model of the three-dimensional object by causing the 3D object to obstruct a possible 3D scanning method, and
      causing the three dimensional printing device to form the three-dimensional object with the anti-counterfeiting measure using the build material.

2. The method of claim 1, further comprising, by the processor, identifying one or more concealment parameters that cause the 3D object to exhibit the at least one anti-counterfeiting measure.

3. The method of claim 1, wherein identifying the at least one anti-counterfeiting measure comprises identifying the possible 3D scanning method based on at least one of the following:
   the structural parameters,
   the build material,
   a complexity value of the 3D object, or
   a monetary value of the 3D object.

4. The method of claim 3, wherein the possible 3D scanning method is selected from at least of the following:
   x-ray 3D scanning;
   laser 3D scanning;
   ultrasound 3D scanning;
   magnetic resonance imaging 3D scanning; and
   contact 3D scanning.

5. The method of claim 3, wherein identifying the possible 3D scanning method based on the build material comprises:
   identifying a density value of the build material;
   comparing the density value with a threshold value; and
   identifying a deep penetrating scanning method as the possible 3D scanning method if the density value is greater than the threshold value, else identifying a surface scanning method as the possible 3D scanning method.

6. The method of claim 3, wherein identifying the possible 3D scanning method based on the complexity value comprises:
   retrieving a complexity value of the 3D object from a database;
   comparing the complexity value with a threshold value; and
   identifying a deep penetrating scanning method as the possible 3D scanning method if the complexity value is greater than the threshold value, else identifying a surface scanning method as the possible 3D scanning method.

7. The method of claim 3, wherein identifying the possible 3D scanning method based on the complexity value comprises:
   retrieving a monetary value of the 3D object from a database;
   comparing the monetary value with a threshold value; and
   identifying an expensive scanning method as the possible 3D scanning method if the monetary value is greater than the threshold value, else identifying a non-expensive scanning method as the possible 3D scanning method.

8. The method of claim 1, wherein the at least one anti-counterfeiting measure comprises at least one of the following:
   including a concealment material within the 3D object; or
   imparting a concealment pattern on one or more surfaces of the 3D object.

9. The method of claim 8, wherein the concealment material comprises at least one of the following: an ultrasound-shielding material; an ultrasound-absorbing material; a laser-shielding material; a laser-absorbing material; an x-ray shielding material; an x-ray absorbing material; a gamma-ray shielding material; a gamma-ray absorbing material; a ferromagnetic material that, when exposed to a magnetic field from a magnetic resonance imaging system, will cause the 3D object to alter its shape; or a cantilevered mirror.

10. The method of claim 8, wherein the concealment pattern comprises a plurality of hooks arranged and positioned to prevent creation of an accurate copy of the 3D object by a contact scanner.

11. The method of claim 8, wherein:
   the concealment pattern comprises a pattern that is not visible on the three-dimensional object; and
   the concealment pattern is included in a copy of the 3D object such that it indicates to a user that the copy of the 3D object is a counterfeit.

* * * * *